United States Patent
Endo et al.

(10) Patent No.: US 7,575,092 B2
(45) Date of Patent: Aug. 18, 2009

(54) VEHICLE STEERING CONTROL DEVICE

(75) Inventors: Masaya Endo, Tokyo (JP); Noriyuki Inoue, Tokyo (JP); Mineo Higuchi, Tokyo (JP); Kenji Ogawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 535 days.

(21) Appl. No.: 11/446,203

(22) Filed: Jun. 5, 2006

(65) Prior Publication Data
US 2006/0278467 A1  Dec. 14, 2006

(30) Foreign Application Priority Data
Jun. 9, 2005 (JP) ............................ 2005-169258
Apr. 10, 2006 (JP) ............................ 2006-107667

(51) Int. Cl.
B62D 5/04 (2006.01)

(52) U.S. Cl. ..................... 180/446; 180/405; 701/43

(58) Field of Classification Search ............... 180/446, 180/404, 405; 701/43
See application file for complete search history.

(56) References Cited

U.S. PATENT DOCUMENTS

| | | | |
|---|---|---|---|
| 6,148,949 A * | 11/2000 | Kobayashi et al. | 180/446 |
| 6,425,454 B1 * | 7/2002 | Chabaan et al. | 180/443 |
| 7,424,937 B2 * | 9/2008 | Henry et al. | 188/156 |
| 2003/0079933 A1 * | 5/2003 | Chabaan | 180/446 |
| 2004/0079578 A1 * | 4/2004 | Kurishige et al. | 180/446 |
| 2006/0060412 A1 * | 3/2006 | Bolourchi et al. | 180/443 |
| 2007/0000717 A1 * | 1/2007 | Kumaido et al. | 180/446 |
| 2008/0006469 A1 * | 1/2008 | Sasaki et al. | 180/428 |

FOREIGN PATENT DOCUMENTS

| | | |
|---|---|---|
| EP | 0853029 | 7/1998 |
| EP | 2003-226250 | 8/2003 |
| JP | 09-011928 | 1/1997 |
| JP | 11-059447 | 3/1999 |

* cited by examiner

*Primary Examiner*—Lesley D Morris
*Assistant Examiner*—Tashiana Adams
(74) *Attorney, Agent, or Firm*—Leydig, Voit & Mayer, Ltd.

(57) ABSTRACT

In a vehicle steering control device, a steering torque estimation unit estimates steering torque of a steering wheel based on driving current of an electric actuator; a torque sensor detects the steering torque of the steering wheel; an electric power assist unit is controlled based on the steering torque detected by the torque sensor; and a comparison unit compares the torque detected by the torque sensor with the steering torque estimated by the steering torque estimation unit. The electric power assist unit is controlled based on the estimated steering torque in place of being controlled based on the torque detected by the torque sensor when the torque sensor is judged to be abnormal, based on a comparison.

8 Claims, 6 Drawing Sheets

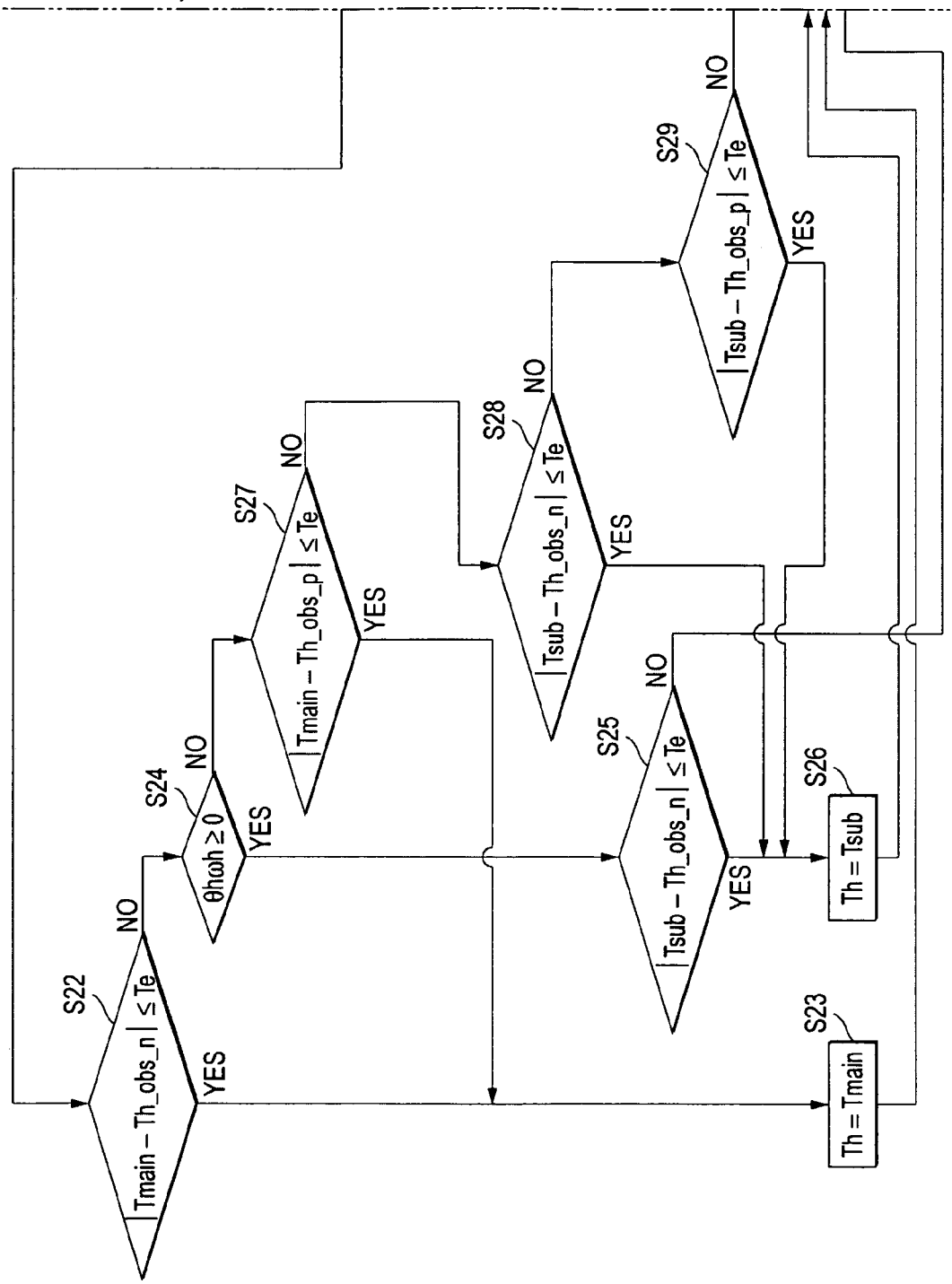
(FIG.6 CONTINUED)

VEHICLE STEERING CONTROL DEVICE

BACKGROUND OF THE INVENTION

1. Field of the Invention

This invention relates to an vehicle steering control device provided with an angle superimposing unit for variably controlling a road wheel angle with respect to a steering angle of a steering operated by a driver and an electric power assist unit for assisting a steering torque of a driver.

2. Description of the Related Art

There has been proposed an vehicle steering control device provided with an angle superimposing unit which variably controls a ratio between a steering angle and a road wheel angle by superposition an intervening angle by an electric actuator on the steering angle operated by a driver with the use of a planetary gear mechanism and a hydraulic power assist unit which assists a steering angle of the driver (see, for example, Patent Document 1).

In this device, it is possible to replace the hydraulic power assist unit with an electric power assist unit.

Though the steering control device provided with the electric power assist unit and the angle superimposing unit has a torque sensor since an assist torque of the electric power assist unit is decided based on the steering torque of the driver, it is impossible to decide the assist torque when the torque sensor develops trouble, thereby making it difficult to continue the assistance.

Therefore, there has been proposed an electric power assist unit which has a torque sensor of a double system type including a main torque sensor and a sub torque sensor from the standpoint of failsafe design and is capable of continuing torque assist by switching to the sub torque sensor in the case where the main torque sensor is abnormal due to trouble or the like (see, for example, Patent Document 2).

Patent Document 1: JP-A-9-11928 (pages 3 to 6, FIGS. 1 to 9)

Patent Document 2: Japanese Patent No. 3390333 (pages 5 to 6, FIG.3)

SUMMARY OF THE INVENTION

In the conventional vehicle steering control device, it is difficult to promptly judge which one of the torque sensors is abnormal in the case where the main torque sensor and the sub torque sensor are switched therebetween, thereby raising a problem of difficulty in continuing torque assist efficiently in the case of torque sensor abnormality.

The invention has been accomplished in the aim of solving the above problem, and an object thereof is to provide a vehicle steering control device capable of promptly judging torque sensor abnormality to continue torque assist.

A vehicle steering control device according to a first aspect of the invention comprises: an angle superimposing unit for variably controlling a road wheel angle with respect to a steering angle of a steering wheel operated by a driver by superposition an angle controlled by an electric actuator on the steering angle of the steering wheel; a steering torque estimation unit for estimating a steering torque of the steering based on a driving current of the electric actuator; a torque sensor for detecting the steering torque of the steering operated by the driver; an electric power assist unit controlled based on a detection value of the torque sensor for assisting the steering torque of the driver; and a comparison unit for comparing the detection value of the torque sensor with the estimated value of the steering toque estimation unit, wherein the vehicle steering control device judges whether the torque sensor is normal or abnormal based on a result of the comparison by the comparison unit and, when it is judged that the torque sensor is abnormal, controls the electric power assist unit based on the estimated value of the steering torque estimation unit in place of controlling based on the detection value of the torque sensor.

A vehicle steering control device according to a second aspect of the invention comprises: an angle superimposing unit for variably controlling a road wheel angle with respect to a steering angle of a steering wheel operated by a driver by superposition an angle controlled by an electric actuator on the steering angle of the steering wheel; a steering torque estimation unit for estimating a steering torque of the steering wheel based on a driving current of the electric actuator; a main torque sensor for detecting the steering torque of the steering wheel operated by the driver; a sub torque sensor having a constitution identical to that of the main torque sensor and detecting the steering torque; an electric power assist unit controlled based on a detection value of the main torque sensor for assisting the steering torque; and a comparison unit for comparing the detection value of the main torque sensor, the detection value of the sub torque sensor, and the estimated value of the steering toque estimation unit with one another, wherein the vehicle steering control device judges whether the main torque sensor is normal or abnormal based on a result of the comparison by the comparison unit and, when it is judged that the main torque sensor is abnormal, controls the electric power assist unit based on the estimated value of the steering torque estimation unit or the detection value of the sub torque sensor in place of controlling based on the detection value of the main torque sensor.

According to the first aspect of the invention, since the vehicle steering control device comprises the comparison unit for comparing the detection value of the torque sensor with the estimated value of the steering torque estimation unit and judges whether the torque sensor is normal or abnormal based on the comparison result of the comparison unit to control the electric power assist unit based on the estimate value of the steering torque estimation unit in place of controlling based on the detection value of the torque sensor when it is judged that the torque sensor is abnormal, it is possible to promptly judge abnormality of the torque sensor without using a torque sensor of double system type and to continue the torque assist reliably and rapidly based on the estimated value of the steering torque estimation unit.

Also, according to the second aspect of the invention, the vehicle steering control device comprises the main torque sensor and the sub torque sensor having the identical constitution and compares the detection value of the main torque sensor, the detection value of the sub torque sensor, and the estimated value of the steering torque estimation unit with one another by the comparison unit to judge whether the main torque sensor is normal or abnormal based on the comparison result, so that the electric power assist unit is controlled based on the detection value of the sub torque sensor or the estimated value of the steering torque estimation unit in place of being controlled based on the detection value of the main torque sensor when it is judged that the main torque sensor is abnormal; therefore, it is possible to promptly judge abnormality of the main torque sensor with reliability similar to that of a torque sensor of triple system type and to continue the torque assist more reliably.

DESCRIPTION OF THE PREFERRED EMBODIMENTS

Embodiment 1

Figure 1:
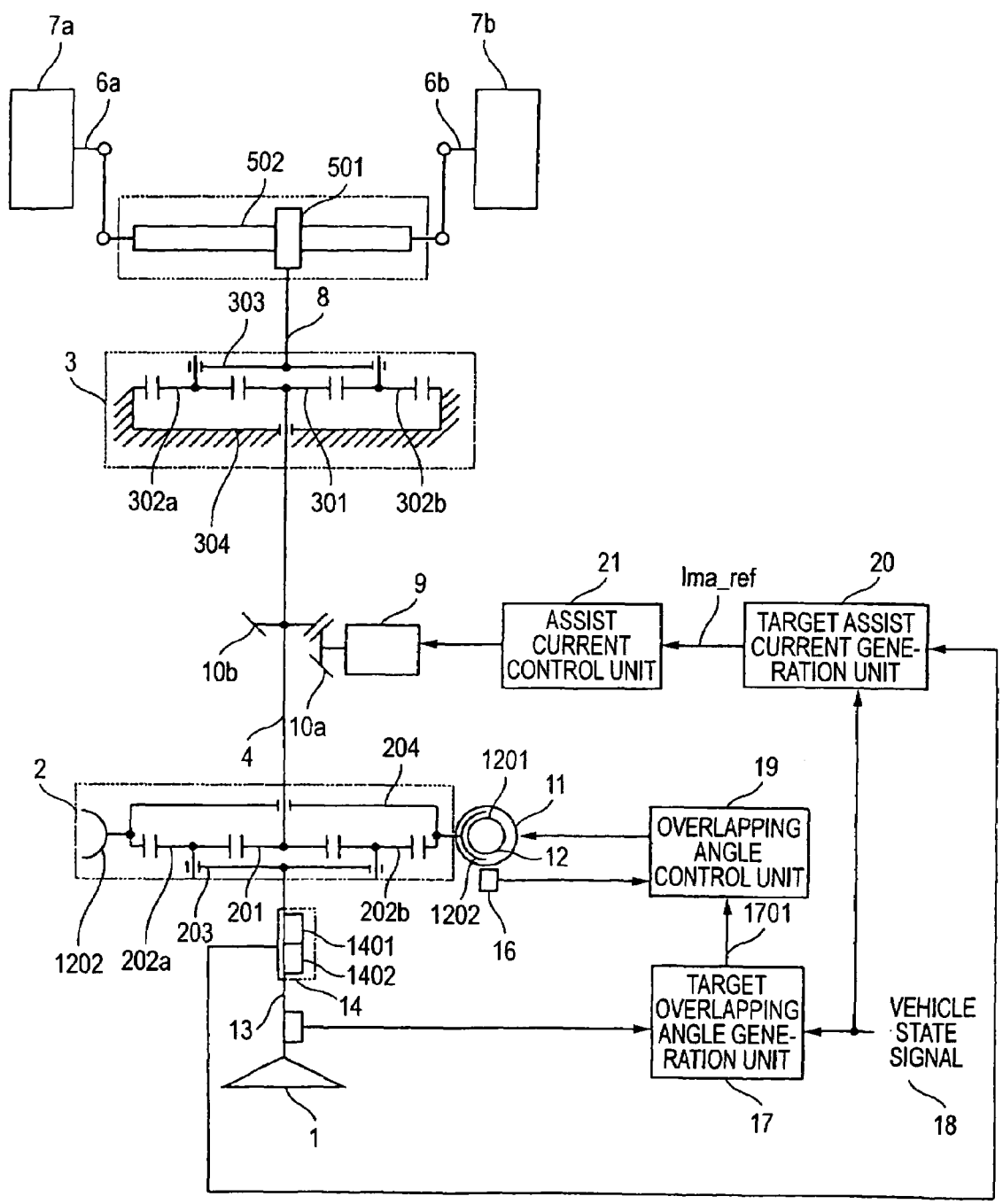
FIG. 1 is a block diagram showing a vehicle steering control device according to Embodiment 1 of the invention.

FIG. 1 is a block diagram showing a vehicle steering control device according to Embodiment 1 of the invention, and the vehicle steering control device is provided with an angle superimposing unit capable of variably controlling a road wheel angle with respect to a steering angle of a steering wheel operated by a driver and an electric power assist unit assisting a steering torque of the driver.

Referring to FIG. 1, a driver (not shown) operates a steering wheel 1. The steering wheel 1 is connected to a carrier 203 of a first planetary gear mechanism 2 via a steering shaft 13. The first planetary gear mechanism 2 is formed of the carrier 203, planetary gears 202a and 202b supported by the carrier 203, a sun gear 201 engaged to the planetary gears 202a and 202b, a ring gear 204, and a worm wheel 1202 for rotating the ring gear 204.

A second planetary gear mechanism 3 is formed of a sun gear 301, planetary gears 302a and 302b supported by a carrier 303, and a fixed ring gear 304.

The sun gear 201 of the first planetary gear mechanism 2 and the sun gear 301 of the second planetary gear mechanism 3 are connected to each other by a shaft 4.

A rack-and-pinion steering gear 5 is formed of a pinion 501 and a rack 502. The rack 502 is connected to wheels 7a and 7b via knuckle arms 6a and 6b. The carrier 303 of the second planetary gear mechanism 3 and the pinion 501 are connected to each other by a pinion shaft 8.

An output shaft of a power assist electric actuator 9 is coupled to a bevel gear 10a, and the bevel gear 10a is engaged to a bevel gear 10b coupled to the shaft 4. An output shaft of an angle superposition electric actuator 11 is couple to a worm 1201, and the worm 1201 is engaged to the worm wheel 1202. A decelerating mechanism 12 is formed of the worm 1201 and the worm wheel 1202. A steering torque generated when the driver operates the steering wheel 1 is detected by a torque sensor 14 disposed on the steering shaft 13. The torque sensor 14 is the double system type having a main torque sensor 1401 and a sub torque sensor 1402. A steering angle of the steering wheel 1 is detected by a steering angle sensor 15 disposed on the steering shaft 13. A rotating angle of the angle supeposition electric actuator 11 is detected by a motor angle sensor 16.

Hereinafter, the angle superimposing unit formed of an superimposed angle control unit 19, a target superimposed angle generation unit 17, the angle supeposition electric actuator 11, and a first deceleration mechanism 2, and the like will be described.

The target superimposed angle generating unit 17 generates a target superimposed angle 1701 of the angle supeposition electric actuator 11 from vehicle state signals 18 such as a steering angle of the steering wheel operated by the driver and detected by the steering angle sensor 15, a vehicle speed, a yaw rate, and a lateral acceleration. The superimposed angle control unit 19 drives the angle supeposition electric actuator 11 so as to make the rotation angle of the angle superposition electric actuator 11 detected by the motor angle sensor 16 equal to the target superimposed angle 1701 generated by the target superimposed angle generation unit 17.

Based on differential characteristic of the first planetary gear mechanism 2, a rotation angle of the shaft 4 is decided from the steering angle operated by the driver and the superimposed angle by the angle supeposition electric actuator 11. Thus, it is possible to variably control a road wheel angle with respect to the steering angle operated by the driver.

Hereinafter, the electric power assist unit formed of a target assist current generation unit 20, an assist current control unit 21, and the power assist electric actuator 9, and the like will be described.

The target assist current generation unit 20 generates a target assist current 2001 for the power assist electric actuator 9 from the detection value of the torque sensor 14 and the vehicle speed obtained from the vehicle state signal 18. The assist current control unit 21 controls a driving current of the power assist electric actuator 9 so as to make the driving current equal to the target assist current 2001. The power assist electric actuator 9 outputs an assist torque corresponding to the driving current thereof to assist the steering torque of the driver.

Figure 2:
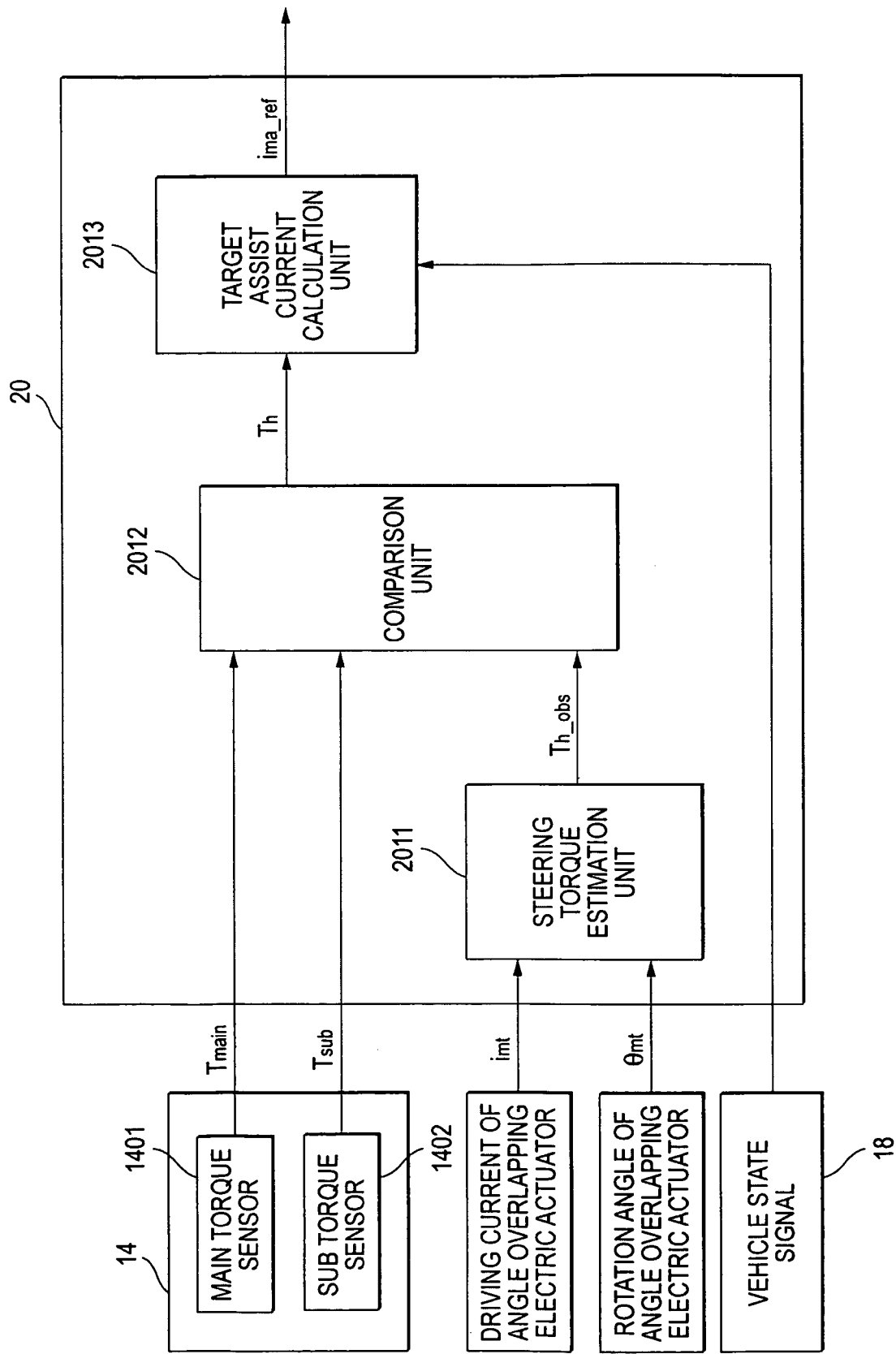
FIG. 2 is a block diagram showing a target assist current generation unit which is a main part of the vehicle steering control device according to Embodiment 1 of the invention.

FIG. 2 is a block diagram showing a major constitution of the target assist current generation unit 20. Referring to FIG. 2, a steering torque estimation unit 2011 calculates an estimated steering torque $T_{h\_obs}$ as described later in this specification. A comparison unit 2012 compares a torque $T_{main}$ detected by the main torque sensor 1401, a torque $T_{sub}$ detected by the sub torque sensor 1402, and the estimated steering torque $T_{h\_obs}$ estimated by the steering torque estimation unit 2011 to judge whether the main torque sensor 1401 is normal or abnormal due to trouble or the like and, when it is judged that the main torque sensor 1401 is normal, outputs the torque $T_{main}$ detected by the main torque sensor 1402 as a steering torque $T_h$ to a target assist current calculation unit 2013. When it is judged that the main torque sensor 1401 is abnormal, the torque $T_{sub}$ detected by the sub torque sensor 1402 or the estimated steering torque $T_{h\_obs}$ calculated by the steering torque estimate unit 2011 as the steering torque $T_h$ to the target assist current calculation unit 2013.

The target assist current calculation unit 2013 calculates a target assist current $i_{ma\_ref}$ of the power assist electric actuator 9 from the signal of the steering torque $T_h$ which is the output from the comparison unit 2012 and the speed signal obtained from the vehicle speed state signal 18 to output the calculated target assist current $i_{ma\_ref}$.

In the following equations: a deceleration ratio from the sun gear 201 of the first planetary gear mechanism 2 to the carrier 203 is represented by $G_{1s}$; a deceleration ratio from the ring gear 204 to the carrier 203 is represented by $G_{1r}$; a deceleration ratio from the angle superposition electric actuator 11 to the ring gear 204, i.e. a deceleration ratio of the deceleration mechanism formed of the worm 1201 and the worm wheel 1202, is represented by $G_{mr}$; a deceleration ratio from the power assist electric actuator 9 to the shaft 4, i.e. a deceleration ratio from the bevel gear 10a to the bevel gear 10b, is represented by $G_{ma}$; and a deceleration ratio from the sun gear 301 of the second planetary gear mechanism 3 to the carrier 303 is represented by $G_{2s}$.

Since a deceleration ratio from the pinion shaft 8 to the wheel is decided depending on the rack-and-pinion steering gear 5, a pinion angle of the pinion shaft 8 is used in place of a road wheel angle in the following description.

When the steering angle of the steering 1 is $\theta_h$; the rotation angle of the angle supeposition electric actuator 11 is $\theta_{mt}$, the rotation angle of the shaft 4 is $\theta_s$; and the pinion angle of the pinion shaft 8 is $\theta_p$, a relationship of the following equations 1 and 2 is established.

$$\theta_s = G_{1s}\theta_h + \frac{G_{1s}}{G_{1r}G_{mt}}\theta_{mt} \quad \text{(Equation 1)}$$

$$\theta_s = G_{2s}\theta_p \quad \text{(Equation 2)}$$

The following equation 3 is obtained from the equations 1 and 2.

$$\theta_p = \frac{G_{1s}}{G_{2s}}\theta_h + \frac{G_{1s}}{G_{2s}G_{1r}G_{mt}}\theta_{mt} \quad \text{(Equation 3)}$$

When the deceleration ratio $G_{1s}$ from the sun gear 201 of the first planetary gear mechanism 2 to the carrier 203 and the deceleration ratio $G_{2s}$ from the sun gear 301 of the second planetary gear mechanism 3 to the carrier 303 are set as shown in the following equation 4, the angle relational equation 3 is obtained by the following equation 5.

$$G_{1s} = G_{2s} \quad \text{(Equation 4)}$$

$$\theta_p = \theta_h + \frac{1}{G_{1r}G_{mt}}\theta_{mt} \quad \text{(Equation 5)}$$

Thus, it is possible to vary the pinion angle $\theta_p$ of the pinion shaft 8, i.e. the road wheel angle of the vehicle, by controlling the rotation angle $\theta_{mt}$ of the angle supeposition electric actuator 11 with respect to the steering angle $\theta_h$ of the steering wheel 1 of the driver.

In the case where: the driver operates the steering wheel 1; the detection value of the torque sensor 14 is $T_h$; and a torque acting on the ring gear 204 is $T_{1r}$, a relational equation of torque transmission is represented by the following equation 6.

$$T_h = -G_{1r}T_{1r} \quad \text{(Equation 6)}$$

In order to explain transmission efficiency of the deceleration mechanism 12, negative input efficiency (output torque of the worm 1201/input torque of the worm wheel 1202) is represented by $\eta_n$, and positive input efficiency (output torque of the worm 1202/input torque of the worm 1201) is $\eta_p$ in the following equations. In Embodiment 1, the negative input efficiency $\eta_n$ is set to a value similar to that of the positive input efficiency $\eta_p$, so that the self locking is prevented.

Though the worm gear mechanism is used as the deceleration mechanism 12 in Embodiment 1, it is of course possible to use any other deceleration mechanism without limitation to the worm gear mechanism.

When the output torque of the angle supeposition electric actuator 11 is $T_{mt}$, a motion equation of the following equation 7 is obtained.

$$J_{wmt}\frac{\alpha_{mt}}{G_{mt}} = \eta_p G_{mt}T_{mt} + T_{1r} \quad \text{(Equation 7)}$$

Note that $J_{wmt}$ represents equivalent inertia obtained by converting the rotor formed of the angle supeposition electric actuator 11 and the like with the use of the rotation shaft of the worm wheel 1202. Also, $\alpha_{mt}$ represents a second order derivative of the rotation angle $\theta_{mt}$ of the angle supeposition electric actuator 11.

The output torque $T_{mt}$ of the angle supeposition electric actuator 11 and the driving current $i_{mt}$ of the angle supeposition electric actuator 11 are in a relationship represented by the following equation 8.

$$T_{mt} = K_{mt}i_{mt} \quad \text{(Equation 8)}$$

In the equation 8, $K_{mt}$ is a torque constant of the angle overlapping electric actuator 11.

From the equations 6 to 8, the estimated steering torque $T_{h\_obs}$ will be estimated as shown in the following equation 9.

$$T_{h\_obs} = \eta_p G_{mt}G_{1r}K_{mt}i_{mt} - J_{wmt}\frac{G_{1r}}{G_{mt}}\alpha_{mt} \quad \text{(Equation 9)}$$

Here, the positive input efficiency is obtained from specification of the gears constituting the deceleration mechanism 12. The positive input efficiency may also be obtained experimentally. Further, the positive input efficiency $\eta p$ may be obtained as map data for a revolution of the angle supeposition electric actuator 11.

In the case where a steering frequency is relatively low and an inertia term can be ignored, the following equation 10 may be used.

$$T_{h\_obs} = \eta_p G_{mt}G_{1r}K_{mt}i_{mt} \quad \text{(Equation 10)}$$

Figure 3:
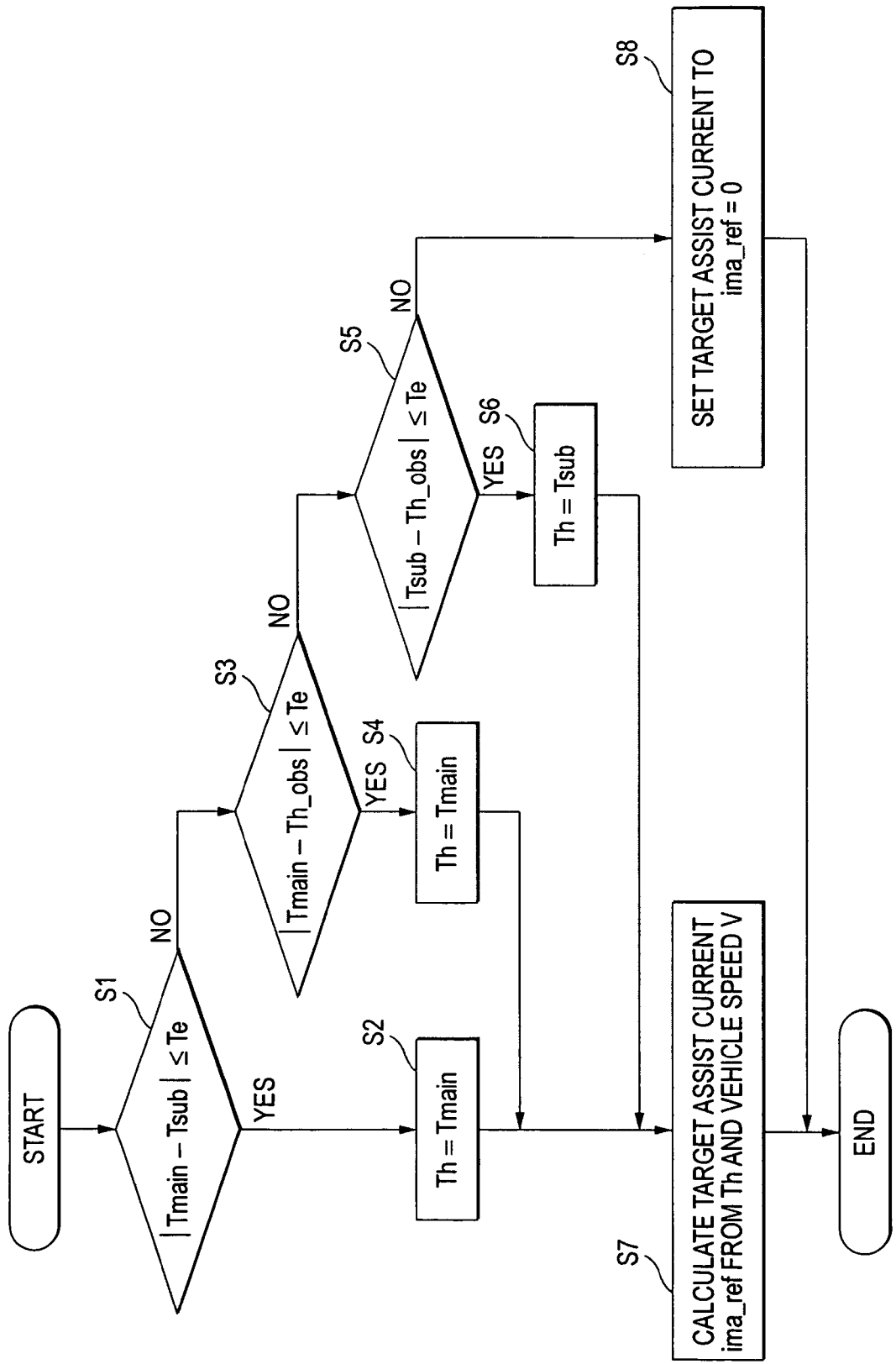
FIG. 3 is a flowchart showing an operation of the vehicle steering control device according to Embodiment 1 of the invention.

Shown in FIG. 3 is a flowchart of the target assist current generation unit 20. Referring to FIG. 3, a deviation between the output torque $T_{main}$ of the main torque sensor 1401 and the output torque $T_{sub}$ of the sub torque sensor 1402 is calculated in Step S1, and, when an absolute value of the deviation is equal to or less than a threshold value $T_e$, it is judged that the torque sensor 14 constituted of the main torque sensor 1401 and the sub torque senor 1402 is normal, so that the steering torque is set to $T_h = T_{main}$ in Step S2.

In the case where the absolute value of the deviation calculated in Step S1 is larger than the threshold value $T_e$, it is judged that either one of the main torque sensor 1401 or the sub torque sensor 1402 is abnormal, so that processing of Step S3 is performed. That is, in Step S3, an absolute value of deviation between the output torque $T_{main}$ of the main torque sensor 1401 and the estimated steering torque $T_{h\_obs}$ is calculated, and, when the value is equal to or less than a threshold value $T_e$, it is judged that the abnormality of the torque sensor 14 occurs in the sub torque sensor 1402, so that the steering torque is set to $T_h = T_{main}$ in Step S4.

When the absolute value of the deviation between the output torque $T_{main}$ of the main torque sensor 1401 and the estimated steering torque $T_{h\_obs}$ which was calculated in the Step S3 is larger than the threshold value $T_e$, it is judged that the abnormality of the torque sensor 14 occurs in the main torque sensor 1401, so that the process proceeds to Step S5. In Step S5, an absolute value of deviation between the output torque $T_{sub}$ of the sub torque sensor 1402 and the estimated steering torque $T_{h\_obs}$ is calculated, and, when the absolute value is equal to or less than a threshold value $T_e$, the process proceeds to Step S6 to set the steering torque to $T_h=T_{sub}$. In this case, the steering torque of $T_h=T_{h\_obs}$ may be set in place of $T_h=T_{sub}$.

In Step S7, the target assist current $i_{ma\_ref}$ is calculated from the steering torque $T_h$ and the vehicle speed V that are set as described in the foregoing. In the case where the absolute value of the deviation of the output torque $T_{sub}$ of the sub torque sensor 1402 and the estimated steering torque $T_{h\_obs}$, which was calculated in Step S5, is larger than the threshold value $T_e$, the process proceeds to Step S8 to set the target assist current $i_{ma\_ref}$ to 0 ($i_{ma\_ref}=0$), thereby stopping assistance.

As described in the foregoing, according to the vehicle steering control device of Embodiment 1, it is possible to judge the trouble of the main torque sensor promptly by comparing the main torque sensor, the sub torque sensor, and the estimated steering torque with one another, so that the electric power assist unit continues its assist of the steering torque of the driver without design change and cost increase.

Also, since the estimated steering torque is calculated with the use of the transmission efficiency of the deceleration mechanism, it is possible to estimate the steering torque with high accuracy.

Also, though the absolute value of the deviation exceeding the threshold value is used for judging the trouble by the mutual comparison, the trouble judgment method is not limited to the above-described one.

It is possible to omit the sub torque sensor by using the estimated steering torque in place of the sub torque sensor. In such case, it is possible to reduce the cost with maintaining the reliability of the torque sensor similar to that of the double system type including the main torque sensor and the sub torque sensor.

Embodiment 2

In Embodiment 2, the negative input efficiency $\eta_n$ (output torque of the worm 1201/input torque of the worm wheel 1202) of the deceleration mechanism 12 constituted of the worm 1201 and the worm wheel 1202 of Embodiment 1 shown in FIG. 1 is set to a value smaller than the positive input efficiency $\eta_p$ (output torque of the worm wheel 1202/input torque of the worm 1201). As a result, when the driving current of the angle supeposition electric actuator 11 is $i_{mt}=0$, it is impossible to rotate the worm 1201 by way of the worm wheel 1202 so that the deceleration mechanism 12 is capable of self locking.

In this case, the following two cases can be true depending on relationships between the output torque $T_{mt}$ of the angle superposition electric actuator 11, which is the torque acting from the worm 1201, and the torque acting from the worm wheel 1202, i.e. the torque $T_{1r}$ acting on the ring gear 204.

One of them is the case of worm driving where the torque acting on the worm 1201 rotates the worm 1201 in resistance to the torque acting on the worm wheel 1202. Motion equation of the worm driving is shown below as equation 11 which is the same as the equation 7.

$$J_{wmt}\frac{\alpha_{mt}}{G_{mt}} = \eta_p G_{mt} T_{mt} + T_{1r} \qquad \text{(Equation 11)}$$

Accordingly, in the same manner as in Embodiment 1, the estimated steering torque Th_obs in the case of worm driving is obtained as in the following equation 12.

$$T_{h\_obs\_p} = \eta_p G_{mt} G_{1r} K_{mt} i_{mt} - J_{wmt}\frac{G_{1r}}{G_{mt}}\alpha_{mt} \qquad \text{(Equation 12)}$$

In the case where a steering frequency is relative low and an inertia item can be ignored, the following equation 13 may be used.

$$T_{h\_obs\_p} = \eta_p G_{mt} G_{1r} K_{mt} i_{mt} \qquad \text{(Equation 13)}$$

The other case is the worm wheel driving, wherein the torque acting on the worm 1201 is in the same direction as that of the torque acting on the worm wheel 1202 to rotate the worm wheel 1202. Motion equation of this case is as shown in the following equation 14.

$$J_{mt}\alpha_{mt} = K_{mt} i_{mt} + \eta_n \frac{T_{1r}}{G_{mt}} - T_{fric} \qquad \text{(Equation 14)}$$

Note that $j_{mt}$ represents equivalent inertia obtained by converting the rotor formed of the angle supeposition electric actuator 11. Also, $T_{fric}$ represents friction inherent in the deceleration mechanism 12, angle supeposition electric actuator 11, and the like and obtainable experimentally from an output value of a normal torque sensor. In addition, the friction $T_{fric}$ may be obtained and used as map data for the revolution of the angle supeposition electric actuator 11.

The following equation 15 is obtained from the equations 6 and 14.

$$J_{mt}\alpha_{mt} = K_{mt} i_{mt} - \eta_n \frac{T_h}{G_{mt}G_{1r}} - T_{fric} \qquad \text{(Equation 15)}$$

Therefore, it is possible to estimate the estimated steering torque $T_{h\_obs}$ in the case of worm wheel driving as shown in the following equation 16.

$$T_{h\_obs\_n} = G_{mt} G_{1r}(K_{mt} i_{mt} - J_{mt}\alpha_{mt} T_{fric})\frac{1}{\eta_n} \qquad \text{(Equation 16)}$$

Here, the positive input efficiency $\eta_p$ and the negative input efficiency $\eta_n$ are obtained from the performance of the gears constituting the deceleration mechanism 12, but they may be obtained experimentally. Also, the positive input efficiency $\eta_p$ and the negative input efficiency $\eta_n$ may be obtained and used as map data for the revolution of the angle supeposition electric actuator 11.

Hereinafter, a ratio of the pinion angle $\theta_p$ of the pinion shaft 8 to the steering angle $\theta_h$ of the steering wheel 1 is set to a transmission ratio of $R=\theta_p/\theta_h$, and influences of the transmission ratio R to be exerted on the steering torque estimation will be described.

In the constitutions relating to Embodiments 1 and 2, the transmission ratio $R=\theta_p/\theta_h=1$ means a state which is free from the angle superposition by the angle supeposition electric actuator 11 with the rotation angle $\theta_{mt}$ of the angle supeposition electric actuator 11 being controlled to 0 ($\theta_{mt}=0$).

The transmission ratio $R=\theta_p/\theta_h>1$ means a state in which the angle superposition by the angle supeposition electric actuator 11 is so controlled as to cause the road wheels to rotate further than the steering angle $\theta_h$ of the driver.

The transmission ratio $0<R=\theta_p/\theta_h>1$ means a state in which the angle superposition by the angle supeposition electric actuator 11 is so controlled as to keep the steering amount of the road wheels smaller than the steering angle $\theta_h$ of the driver.

Hereinafter, regions of the worm driving and the worm wheel driving in the case of the transmission ratio $R=\theta_p/\theta_h>1$ will be described.

Figure 4:
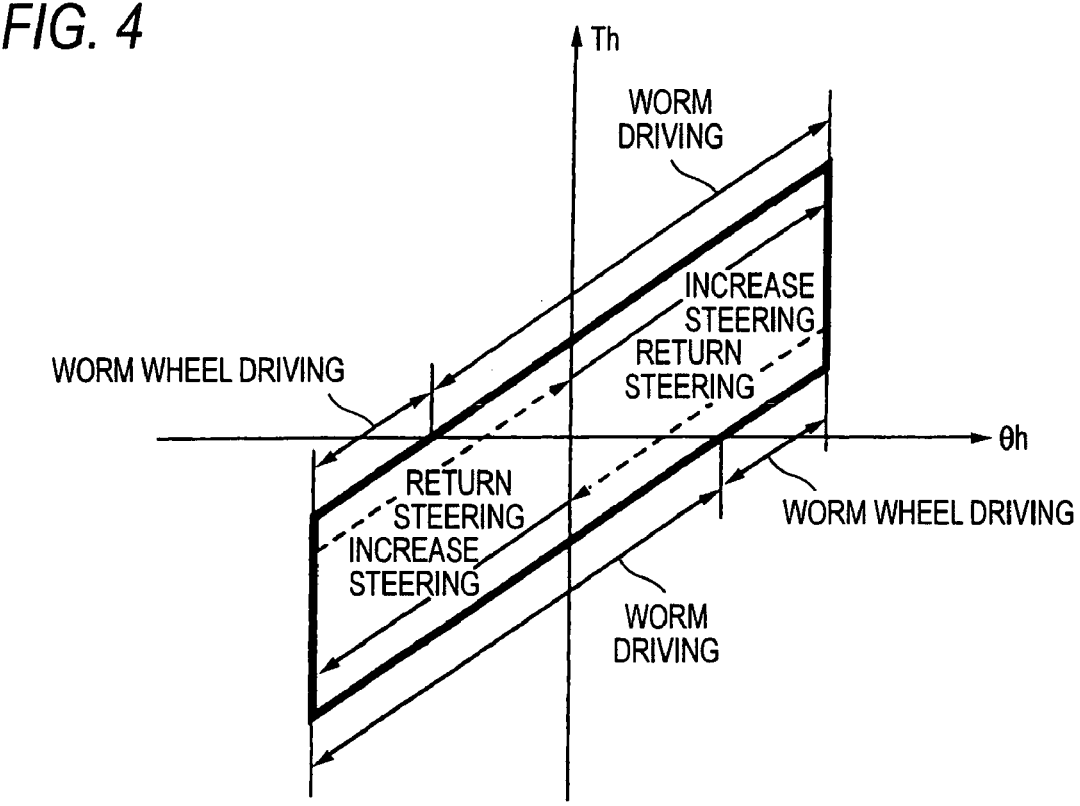
FIG. 4 is a diagram for illustrating a relationship (R>1) between a steering angle $\theta_h$ and a steering torque $T_h$.

FIG. 4 is an illustration of one example of a relationship between the steering angle $\theta_h$ and the steering torque $T_h$. As shown in FIG. 4, a region wherein the steering torque is $T_h>0$ of returning from the steering angle of $\theta_h>0$ and a region wherein the steering torque is $T_h<0$ of returning from the steering angle of $\theta_h<0$ are the worm driving regions, and other regions are the worm wheel driving regions.

Also, regions of the worm driving and the worm wheel driving in the case of the transmission ratio $0<R=\theta_p/\theta_h<1$ will be described.

Figure 5:
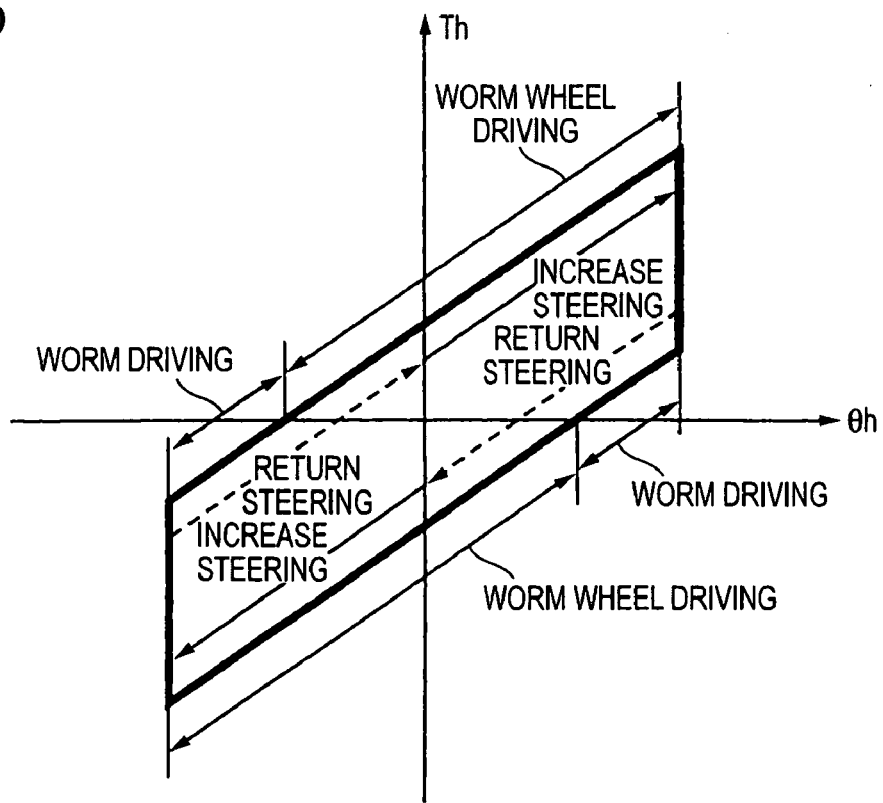
FIG. 5 is a diagram for illustrating a relationship (0<R<1) between a steering angle $\theta_h$ and a steering torque $T_h$.

FIG. 5 is an illustration of one example of a relationship between the steering angle $\theta_h$ and the steering torque $T_h$. As shown in FIG. 5, a region wherein the steering torque is $T_h>0$ of returning from the steering angle of $\theta_h>0$ and a region wherein the steering torque is $T_h<0$ of returning from the steering angle of $\theta_h<0$ are the worm driving regions, and other regions are the worm wheel driving regions. That is, the transmission ratio R of this case is reverse to the case of $R=\theta_p/\theta_h>1$.

In the case of the transmission ratio $R=\theta_p/\theta_h=1$, the angle superposition by the angle superposition electric actuator 11 is null, i.e. the rotation angle of the angle superposition electric actuator 11 is controlled to the rotation angle $\theta_{mt}=0$ as described above. However, since the self locking of the deceleration mechanism 12 is active in this state, it is difficult to keep the balance between the driving current $i_{mt}$ of the angle superposition electric actuator 11 and the external torque, thereby making it difficult to estimate the steering torque.

Figure 6:
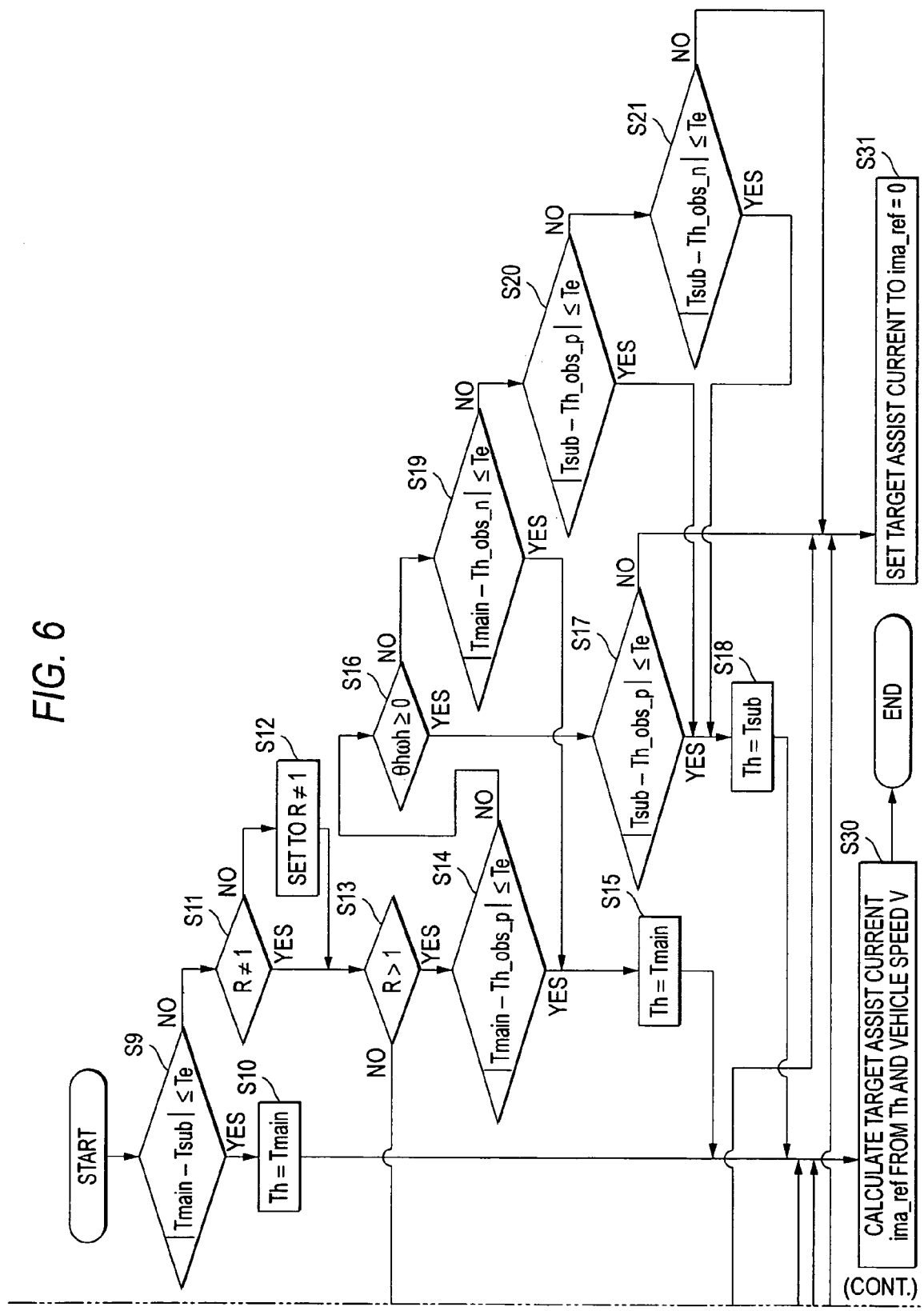
FIG. 6 is a flowchart showing an operation of a vehicle steering control device according to Embodiment 2 of the invention.

In view of the above, the vehicle steering control device according to Embodiment 2 will be described. FIG. 6 is a flowchart showing an operation of the target assist current generation unit 20 of Embodiment 2. Referring to FIG. 6, deviation between the output torque $T_{main}$ of the main torque sensor 1401 and the output torque $T_{sub}$ of the sub torque sensor 1402 is calculated in Step S9, and, when an absolute value of the deviation is equal to or less than a threshold value $T_e$, it is judged that the torque sensor 14 constituted of the main torque sensor 1401 and the sub torque sensor 1402 is normal to set the steering torque to $T_h=T_{main}$ in Step S10.

In the case where the absolute value of the deviation calculated in Step S9 is larger than the threshold value $T_e$, it is judged that either one of the main torque sensor 1401 or the sub torque sensor 1402 is abnormal to perform processing of Step S11. In Step S11, the process proceeds to Step S13 when the transmission ratio is $R\neq 1$, while the process proceeds to Step S12 when the transmission ratio is $R=1$ to control the transmission ratio to $R\neq 1$ since it is difficult to estimate the steering torque due to influence of the self locking when the transmission ratio is $R=1$.

In Step 13, discrimination between the case where the transmission rate is $R>1$ and the case where the transmission rate is $R<1$ is performed. In the case of the transmission ratio is $R>1$, an absolute value of deviation between the output torque $T_{main}$ of the main torque sensor 1401 and the estimated torque $T_{h\_obs\_p}$ during the worm driving is calculated in Step S14, and, when the value is equal to or less than a threshold value $T_e$, it is judged that the main torque sensor 1401 is normal to set the steering torque to $T_h=T_{main}$ in Step S15.

In the case where the absolute value of the deviation between the output torque $T_{main}$ of the main torque sensor 1401 and the estimated torque during worm driving $T_{h\_obs\_p}$ is larger than the threshold value $T_e$, an increase in steering is decided in Step S16 since it is possible that the main torque sensor 1401 is abnormal or that it is in the worm wheel driving state.

The judgment of increase in steering is made when a value obtained by multiplying the steering angle $\theta_h$ by the steering angle speed $\omega_h$ is $\theta_h\omega_h>0$ or $\theta_h\omega_h=0$. Since the case where the judgment of increase in steering is made means that the worm driving is being performed as shown in FIG. 4, it is judged that the main torque sensor 1401 is abnormal to proceed to Step S17. In Step S17, an absolute value of deviation between the output torque $T_{sub}$ of the sub torque sensor 1402 and the estimated torque $T_{h\_obs\_p}$ during the worm driving is calculated, and, when the value is equal to or less than a threshold value $T_e$, the process proceeds to Step S18 to set the steering torque to $T_h=T_{sub}$. In the case where the absolute value of deviation between the output torque $T_{sub}$ of the sub torque sensor 1402 and the estimated torque $T_{h\_obs\_p}$ during the worm driving is larger than the threshold value $T_e$ in Step S17, the process proceeds to Step S31 to set the target assist current $i_{ma\_ref}$, thereby stopping the assistance.

Since it is possible that the worm wheel driving is performed as shown in FIG. 4 when the judgment of increase in steering is made in Step S16, an absolute value of deviation between the output torque $T_{main}$ of the main torque sensor 1401 and the estimated torque during worm wheel driving $T_{h\_obs\_n}$ is calculated in Step S19. In the case where the absolute value is equal to or less than a threshold value $T_e$, it is judged that the main torque sensor 1401 is normal to set the steering torque $T_h=T_{main}$ in Step S15.

In the case where the absolute value of deviation between the output torque $T_{main}$ of the main torque sensor 1401 and the estimated torque during worm wheel driving $T_{h\_obs\_n}$ is larger than the threshold value $T_e$ in Step S19, it is judged that the main torque sensor 1401 is abnormal to proceed to Step S20.

In Step S20, an absolute value of deviation between the output torque $T_{sub}$ of the sub torque sensor 1402 and the estimated torque $T_{h\_obs\_p}$ during the worm driving is calculated, and, when the value is equal to or less than a threshold value $T_e$, the process proceeds to Step S18 to set the steering torque to $T_h=T_{sub}$.

In the case where the absolute value of deviation between the output torque $T_{sub}$ of the sub torque sensor 1402 and the estimated torque $T_{h\_obs\_p}$ during the worm driving is larger than the threshold value $T_e$ in Step S20, the process proceeds to Step S21.

In Step 21, an absolute value of deviation between the output torque $T_{sub}$ of the sub torque sensor 1402 and the estimated torque $T_{h\_obs\_n}$ during the worm wheel driving is calculated, and, when the value is equal to or less than a threshold value $T_e$, the process proceeds to Step S18 to set the steering torque to $T_h=T_{sub}$.

In the case where the absolute value of deviation between the output torque $T_{sub}$ of the sub torque sensor 1402 and the estimated torque $T_{h\_obs\_n}$ during the worm wheel driving is larger than the threshold value $T_e$ in Step S21, the target assist current is set to $i_{ma\_ref}=0$ thereby to stop the assistance.

In the case where the judgment of $R<1$ is made in Step S13, the process proceeds to Step S22 to calculate an absolute value of deviation between the output torque $T_{main}$ of the main torque sensor 1401 and the estimated torque $T_{h\_obs\_n}$ during the worm wheel driving. When the absolute value is equal to or less than a threshold value $T_e$, it is judged that the main torque sensor 1401 is normal to set the steering torque to $T_h=T_{main}$ in Step S23.

In the case where the absolute value of deviation between the output torque $T_{main}$ of the main torque sensor 1401 and the estimated torque $T_{h\_obs\_n}$ during the worm wheel driving is larger than the threshold value $T_e$ in Step, S22, an increase in steering is decided in Step S24 since it is possible that the main torque sensor 1401 is abnormal or that it is in the worm wheel driving state.

The judgment of increase in steering is made when a value obtained by multiplying the steering angle $\theta_h$ by the steering angle speed $\omega_h$ is $\theta_h\omega_h>0$ or $\theta_h\omega_h=0$. Since the case wherein the judgment of increase in steering is made means that the worm wheel driving is being performed as shown in FIG. 5, it is judged that the main torque sensor 1401 is abnormal to proceed to Step S25. In Step S25, an absolute value of deviation between the output torque $T_{sub}$ of the sub torque sensor 1402 and the estimated torque $T_{h\_obs\_n}$ during the worm wheel driving is calculated, and, when the value is equal to or less than a threshold value $T_e$, the process proceeds to Step S26 to set the steering torque to $T_h=T_{sub}$.

In the case where the absolute value of deviation between the output torque $T_{sub}$ of the sub torque sensor 1402 and the estimated torque $T_{h\_obs\_n}$ during the worm wheel driving is larger than the threshold value $T_e$ in Step S25, the process proceeds to Step S31 to set the target assist current to $i_{ma\_ref}=0$, thereby stopping the assistance.

Since it is possible that the worm driving is performed as shown in FIG. 5 when the judgment of returning steering is made in Step S24, an absolute value of deviation between the output torque $T_{main}$ of the main torque sensor 1401 and the estimated torque $T_{h\_obs\_p}$ during worm driving is calculated in Step S27. In the case where the absolute value is equal to or less than a threshold value $T_e$, it is judged that the main torque sensor 1401 is normal to set the steering torque to $T_h=T_{main}$ in Step S23.

In the case where the absolute value of deviation between the output torque $T_{main}$ of the main torque sensor 1401 and the estimated torque $T_{h\_obs\_p}$ during worm wheel driving is larger than the threshold value $T_e$ in Step S27, it is judged that the main torque sensor 1401 is abnormal to proceed to Step S28.

In Step S28, an absolute value of deviation between the output torque $T_{sub}$ of the sub torque sensor 1402 and the estimated torque $T_{h\_obs\_n}$ during the worm wheel driving is calculated, and, when the value is equal to or less than a threshold value $T_e$, the process proceeds to Step S26 to set the steering torque to $T_h=T_{sub}$.

In the case where the absolute value of deviation between the output torque $T_{sub}$ of the sub torque sensor 1402 and the estimated torque $T_{h\_obs\_n}$ during the worm wheel driving is larger than the threshold value $T_e$ in Step S28, the process proceeds to Step S29.

In Step S29, an absolute value of deviation between the output torque $T_{sub}$ of the sub torque sensor 1402 and the estimated torque $T_{h\_obs\_p}$ during the worm driving is calculated, and, when the value is equal to or less than a threshold value $T_e$, the process proceeds to Step S26 to set the steering torque to $T_h=T_{sub}$.

In the case where the absolute value of deviation between the output torque $T_{sub}$ of the sub torque sensor 1402 and the estimated torque $T_{h\_obs\_p}$ during the worm driving is larger than the threshold value $T_e$ in Step S29, the process proceeds to Step S31, thereby setting the target assist current to $i_{ma\_ref}=0$ to stop the assistance.

In Step S30, the target assist current $i_{ma\_ref}$ is calculated from the steering torques $T_h$ and the vehicle speed set in the above process steps.

As described in the foregoing, according to Embodiment 2, in the case where the negative input efficiency $\eta_n$ (output toque of the worm 1201/input torque of the worm wheel 1202) of the deceleration mechanism 12 constituted of the worm 1201 and the worm wheel 1202 is set to the smaller value, and the deceleration mechanism 12 is of the self locking type which does not allow the worm 1201 to be rotated from the worm wheel 1202 when the driving current of the angle superposition electric actuator 11 is set to $i_{mt}=0$, it is possible to increase estimation accuracy of the estimated steering torque by judging the steering states when the steering is increased and decreased as well as the transmission ratio and by estimating the estimated steering torque $T_{h\_obs\_p}$ during worm driving and the worm wheel estimated steering torque $T_{h\_obs\_n}$.

Further, it is possible to promptly judge a trouble of the main torque sensor without changing the design and with the cost being suppressed by comparing the detection value of the main torque sensor and the detection value of the sub torque sensor, thereby making it possible to assist the steering torque of the driver by the electric power assist unit.

Though the worm gear mechanism is used as the deceleration mechanism 12 in Embodiment 2, this usage is not limitative, and other deceleration mechanisms may be used.

What is claimed is:

1. A vehicle steering control device comprising:
   an angle superimposing unit for variably controlling road wheel angle with respect to steering angle of a steering wheel operated by a driver by superpositioning an angle controlled by an electric actuator on the steering angle of the steering wheel;
   a steering torque estimation unit for estimating steering torque of the steering wheel, based on driving current of the electric actuator;
   a torque sensor for detecting the steering torque of the steering wheel operated by the driver;
   an electric power assist unit that is controlled, based on the steering torque detected by the torque sensor, for assisting the steering torque of the driver; and
   a comparison unit for comparing the steering torque detected by the torque sensor with the steering torque estimated by the steering torque estimation unit, wherein the vehicle steering control device determines whether the torque sensor is normal or abnormal based on the comparison by the comparison unit and, when the torque sensor is determined to be abnormal, controls the electric power assist unit based on the steering torque estimated by the steering torque estimation unit in place of controlling based on the steering torque detected by the torque sensor.

2. The vehicle steering control device according to claim 1, wherein
   the electric actuator has a rotation shaft coupled to a deceleration mechanism, and
   the steering torque estimation unit estimates the steering torque using one of transmission efficiency of the deceleration mechanism and friction inherent in the deceleration mechanism.

3. The vehicle steering control device according to claim 1, wherein
   the electric actuator has a rotation shaft coupled to a deceleration mechanism having positive and negative input efficiencies, the negative input efficiency having a magnitude smaller than the positive input efficiency, the steering torque estimation unit estimates the steering torque using one of transmission efficiency of the deceleration mechanism and friction inherent in the deceleration mechanism, and the angle superimposing unit controls transmission ratio of the steering angle to the road wheel angle to be a value other than the transmission ratio when rotation angle of the electric actuator is fixed.

4. The vehicle steering control device according to claim 1, wherein the electric actuator has a rotation shaft coupled to a deceleration mechanism having positive and negative input efficiencies, the negative input efficiency having a magnitude smaller than the positive input efficiency, the steering torque estimation unit estimates the steering torque using one of transmission efficiency of the deceleration mechanism and friction inherent in the deceleration mechanism, and the angle superimposing unit controls transmission ratio of the steering angle to the road wheel angle to be a value other than the transmission ratio when the rotation angle of the electric actuator is fixed, and the torque sensor is determined to be abnormal.

5. A vehicle steering control device comprising:

an angle superimposing unit for variably controlling road wheel angle with respect to steering angle of a steering wheel operated by a driver by superpositioning an angle controlled by an electric actuator on the steering angle of the steering wheel;

a steering torque estimation unit for estimating steering torque of the steering wheel, based on driving current of the electric actuator;

a main torque sensor detecting the steering torque of the steering operated by the driver;

a sub torque sensor having a constitution identical to that of the main torque sensor and detecting the steering torque;

an electric power assist unit that is controlled, based on the steering torque detected by the main torque sensor for assisting the steering torque; and a comparison unit for comparing the steering torque detected by the main torque sensor, the steering torque detected by the sub torque sensor, and the steering torque estimated by the steering torque estimation unit with each other, wherein the vehicle steering control device determines whether the main torque sensor is normal or abnormal based on the comparison by the comparison unit and, when the main torque sensor is determined to be abnormal, controls the electric power assist unit based on the steering torque estimated by the steering torque estimation unit or the steering torque detected by the sub torque sensor, in place of controlling based on the steering torque detected by the main torque sensor.

6. The vehicle steering control device according to claim 5, wherein the electric actuator has a rotation shaft coupled to a deceleration mechanism, and the steering torque estimation unit estimates the steering torque using one of transmission efficiency of the deceleration mechanism and friction inherent in the deceleration mechanism.

7. The vehicle steering control device according to claim 5, wherein the electric actuator has a rotation shaft coupled to a deceleration mechanism having positive and negative input efficiencies, the negative input efficiency having a magnitude smaller than the positive input efficiency, the steering torque estimation unit estimates the steering torque using one of transmission efficiency of the deceleration mechanism and friction inherent in the deceleration mechanism, and the angle superimposing unit controls transmission ratio of the steering angle to the road wheel angle to be a value other than the transmission ratio when rotation angle of the electric actuator is fixed.

8. The vehicle steering control device according to claim 5, wherein the electric actuator has a rotation shaft coupled to a deceleration mechanism having positive and negative input efficiencies, the negative input efficiency having a magnitude smaller than the positive input efficiency, the steering torque estimation unit estimates the steering torque using one of transmission efficiency of the deceleration mechanism and friction inherent in the deceleration mechanism, and the angle superimposing unit controls transmission ratio of the steering angle to the road wheel angle to be a value other than the transmission ratio when the rotation angle of the electric actuator is fixed, and the torque sensor is determined to be abnormal.

* * * * *